(12) United States Patent
Park et al.

(10) Patent No.: US 12,438,237 B2
(45) Date of Patent: Oct. 7, 2025

(54) BATTERY CELL AND METHOD FOR MANUFACTURING THE SAME

(71) Applicant: LG ENERGY SOLUTION, LTD., Seoul (KR)

(72) Inventors: Jun-Soo Park, Daejeon (KR); Bum-Young Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 498 days.

(21) Appl. No.: 18/008,336

(22) PCT Filed: Jul. 16, 2021

(86) PCT No.: PCT/KR2021/009214
§ 371 (c)(1),
(2) Date: Dec. 5, 2022

(87) PCT Pub. No.: WO2022/015118
PCT Pub. Date: Jan. 20, 2022

(65) Prior Publication Data
US 2023/0207968 A1   Jun. 29, 2023

(30) Foreign Application Priority Data
Jul. 16, 2020 (KR) .................. 10-2020-0088490

(51) Int. Cl.
*H01M 50/46* (2021.01)
*H01M 50/426* (2021.01)
(Continued)

(52) U.S. Cl.
CPC ....... *H01M 50/461* (2021.01); *H01M 50/426* (2021.01); *H01M 50/446* (2021.01); *H01M 50/457* (2021.01)

(58) Field of Classification Search
CPC .. H01M 8/0267; H01M 8/0228; H01M 8/026; H01M 8/0276; H01M 8/0213;
(Continued)

(56) References Cited

U.S. PATENT DOCUMENTS 8,597,816 B2   12/2013   Nishikawa et al.
2013/0224555 A1   8/2013   Hong et al.
(Continued)

FOREIGN PATENT DOCUMENTS

KR   10-2011-0129203 A   12/2011
KR   10-2014-0070484 A   6/2014
(Continued)

OTHER PUBLICATIONS

European Search Report for European Application No. 21842946.2, dated Aug. 12, 2024.
(Continued)

*Primary Examiner* — Helen Oi K Conley
(74) *Attorney, Agent, or Firm* — Birch, Stewart, Kolasch & Birch, LLP (57) ABSTRACT

A battery cell including an electrode assembly present in a battery casing. The electrode assembly includes a positive electrode, a negative electrode and a separator interposed between the positive electrode and the negative electrode. The separator includes a porous polymer substrate, a first organic/inorganic porous coating layer on at least one surface of the porous polymer substrate, and a second organic/inorganic porous coating layer on a surface of the first organic/inorganic porous coating layer. The first organic/inorganic porous coating layer includes first inorganic particles and a first binder polymer, the second organic/inorganic porous coating layer includes second inorganic particles and a second binder polymer, the second organic/inorganic porous coating layer faces the positive electrode,
(Continued)

and the second binder polymer has a weight average molecular weight higher than the weight average molecular weight of the first binder polymer.

9 Claims, 1 Drawing Sheet

(51) Int. Cl.
*H01M 50/446* (2021.01)
*H01M 50/457* (2021.01)

(58) Field of Classification Search
CPC ............. H01M 8/0258; H01M 8/0271; H01M 8/0297; H01M 2008/1095; H01M 8/0202; Y02E 60/50; C25B 1/04; C25B 9/75; C25B 9/77; C25B 9/21; C25B 9/23
See application file for complete search history.

(56) References Cited

U.S. PATENT DOCUMENTS

| | | |
|---|---|---|
| 2014/0322586 A1 | 10/2014 | Lee et al. |
| 2017/0338480 A1 | 11/2017 | Kim et al. |
| 2018/0034030 A1 | 2/2018 | Yoo et al. |
| 2019/0319239 A1 | 10/2019 | Zhou |
| 2020/0152945 A1 | 5/2020 | Kim et al. |

FOREIGN PATENT DOCUMENTS

| | | |
|---|---|---|
| KR | 10-1515357 B1 | 4/2015 |
| KR | 10-2017-0010625 A | 2/2017 |
| KR | 10-1745631 B1 | 6/2017 |
| KR | 10-2017-0129452 A | 11/2017 |
| KR | 10-2019-0083894 A | 7/2019 |
| KR | 10-2019-0084894 A | 7/2019 |
| KR | 10-2061247 B1 | 12/2019 |
| KR | 10-2020-0078416 A | 7/2020 |
| WO | WO 2018/168835 A1 | 9/2018 |
| WO | WO 2019/217797 A1 | 11/2019 |
| WO | WO 2020/142702 A1 | 7/2020 |

OTHER PUBLICATIONS

International Search Report (PCT/ISA/210) issued in PCT/KR2021/009214, dated Oct. 25, 2021.

BATTERY CELL AND METHOD FOR MANUFACTURING THE SAME

TECHNICAL FIELD

The present application claims priority to Korean Patent Application No. 10-2020-0088490 filed on Jul. 16, 2020 in the Republic of Korea, the disclosures of which are incorporated herein by reference.

The present disclosure relates to a battery cell and a method for manufacturing the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni—MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important.

Meanwhile, 'overcharge' refers to the behavior of continuing to charge a cell beyond the cut-off voltage (e.g. 4.2-4.3 V) to cause an excess of the normal capacity of the cell. Herein, side reactions occur in the electrodes, electrolyte, or the like, in the cell, and the internal temperature of the cell is increased, resulting in shrinking of the separator and an internal short-circuit. Due to the instant short-circuit generated in this case, the cell temperature is increased rapidly and reaction occurs with the combustible gases in the cell so that explosion may occur. Such a rapid increase in cell temperature is further amplified by the low heat conductivity of a lithium-ion cell.

According to the related art, there has been an attempt to insert a pad or foil having excellent heat conductivity to the cell surface in order to solve the above-mentioned problem. In this manner, such a rapid increase in temperature has been reduced by improving the heat-radiating capability (ability to release heat). However, the method cannot satisfy the high energy density required for cells for vehicles currently. This is because the energy density per same volume is reduced, when inserting a pad or foil.

Under these circumstances, there is a need for providing a cell which maintains energy density equivalent to the energy density of the conventional cells, while providing enhanced heat-radiating characteristics.

DISCLOSURE

Technical Problem

The present disclosure is directed to providing a separator which can enhance the overcharge safety without any additional device.

The present disclosure is also directed to providing a cell with improved safety by improving the heat-radiating characteristics of the cell, while maintaining the conventional energy density.

Technical Solution

In one aspect of the present disclosure, there is provided a battery cell according to any one of the following embodiments.

According to the first embodiment, there is provided a battery cell which includes an electrode assembly present in a battery casing, wherein the electrode assembly includes a positive electrode, a negative electrode and a separator interposed between the positive electrode and the negative electrode, wherein the separator includes a porous polymer substrate, a first organic/inorganic porous coating layer on at least one surface of the porous polymer substrate, and a second organic/inorganic porous coating layer on a surface of the first organic/inorganic porous coating layer, the first organic/inorganic porous coating layer includes first inorganic particles and a first binder polymer, the second organic/inorganic porous coating layer includes second inorganic particles and a second binder polymer, the second organic/inorganic porous coating layer faces the positive electrode, and the second binder polymer has a weight average molecular weight higher than the weight average molecular weight of the first binder polymer.

According to the second embodiment, there is provided the battery cell as defined in the first embodiment, wherein the second binder polymer has a weight average molecular weight of 800,000-1,500,000.

According to the third embodiment, there is provided the battery cell as defined in the first or the second embodiment, wherein the first binder polymer has a weight average molecular weight of 300,000-600,000.

According to the fourth embodiment, there is provided the battery cell as defined in any one of the first to the third embodiments, wherein the first organic/inorganic porous coating layer has a thickness larger than the thickness of the second organic/inorganic porous coating layer.

According to the fifth embodiment, there is provided the battery cell as defined in the fourth embodiment, wherein the ratio of the thickness of the first organic/inorganic porous coating layer to the thickness of the second organic/inorganic porous coating layer is 6:4-9:1.

According to the sixth embodiment, there is provided the battery cell as defined in any one of the first to the fifth embodiments, wherein each of the first binder polymer and the second binder polymer is any one independently selected from the group consisting of polyvinylidene fluoride (PVDF), hexafluoropropylene (HFP), polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile-styrene-butadiene copolymer and polyimide, or a mixture of two or more of them.

According to the seventh embodiment, there is provided the battery cell as defined in any one of the first to the sixth embodiments, wherein the adhesion between the separator and the positive electrode is 40 gf/25 mm or more.

According to the eighth embodiment, there is provided the battery cell as defined in any one of the first to the seventh embodiments, wherein the first binder polymer is the same as or different from the second binder polymer.

According to the ninth embodiment, there is provided the battery cell as defined in any one of the first to the eighth embodiments, wherein the first inorganic particles are the same or different from the second inorganic particles.

Advantageous Effects

According to an embodiment of the present disclosure, it is possible to provide a battery cell with increased adhesion between the positive electrode and the separator.

According to an embodiment of the present disclosure, heat emission at high temperature, which occurs when a cell is overcharged, is reduced so that overcharge safety may be enhanced without any additional device.

According to an embodiment of the present disclosure, it is possible to increase the hear-radiating characteristics of a cell, and thus to enhance the overcharge safety of the cell without any additional device. At the same time, it is possible to improve the heat-radiating characteristics of the cell, while maintaining the conventional energy density, and thus to improve the safety of the cell.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the terms 'about', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

When a cell causes ignition due to overcharge, the internal temperature of the cell is increased by the side reactions of the elements forming the cell, caused by the overcharge current. As a result, the separator undergoes shrinking to cause an internal short-circuit. Due to the instant short-circuit generated in this case, the cell temperature is increased rapidly and reaction occurs with the combustible gases in the cell so that explosion may occur. Such a rapid increase in cell temperature is further amplified by the low heat conductivity of a lithium-ion cell.

According to the related art, there has been an attempt to insert a pad or foil having excellent heat conductivity to the cell surface in order to solve the above-mentioned problem. In this manner, such a rapid increase in temperature has been reduced by improving the heat-radiating capability (ability to release heat). However, the method cannot satisfy the high energy density required for cells for vehicles currently. This is because the energy density per same volume is reduced, when inserting a pad or foil.

The inventors of the present disclosure have conducted intensive studies to accomplish the above-mentioned object, and have found that the portion having the highest thermal resistance among the heat resistant elements of a cell is the positive electrode/separator interface. The inventors of the present disclosure have also found that it is required to enhance the adhesion between the positive electrode and the separator to reduce the thermal resistance at the interface.

In one aspect of the present disclosure, there is provided a battery cell which includes an electrode assembly received in a battery casing and including a positive electrode, a negative electrode and a separator interposed between the positive electrode and the negative electrode, wherein the separator includes a porous polymer substrate, a first organic/inorganic porous coating layer formed on at least one surface of the porous polymer substrate, and a second organic/inorganic porous coating layer formed on the first organic/inorganic porous coating layer, the first organic/inorganic porous coating layer includes first inorganic particles and a first binder polymer, the second organic/inorganic porous coating layer includes second inorganic particles and a second binder polymer, the second organic/inorganic porous coating layer faces the positive electrode, and the second binder polymer has a weight average molecular weight higher than the weight average molecular weight of the first binder polymer.

The battery cell according to an embodiment of the present disclosure includes a porous coating layer having two layers. Particularly, the separator inserted in the battery cell includes a porous polymer substrate having a plurality of pores, a first organic/inorganic porous coating layer and a second organic/inorganic porous coating layer.

According to the present disclosure, the porous polymer substrate is a porous membrane and can provide a channel for transporting lithium ions, while insulating the positive electrode and negative electrode electrically from each other to prevent a short-circuit. Any material may be used with no particular limitation, as long as it may be used conventionally as a material for a separator of an electrochemical device.

Particularly, the porous polymer substrate may be a porous polymer film substrate or a porous polymer nonwoven web substrate.

The porous polymer film substrate may be a porous polymer film including polyolefin, such as polyethylene, polypropylene. Such a polyolefin porous polymer film substrate realizes a shut-down function at a temperature of 80-150° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous polymer nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

There is no particular limitation in the thickness of the porous polymer substrate, the porous polymer substrate has a thickness of 1-100 μm, particularly 5-50 μm. As the batteries have been provided with high output/high capacity recently, it is advantageous to use a thin film as a porous polymer substrate. The pores present in the porous polymer substrate may have a dimeter of 10-100 nm, 10-70 nm, 10-50 nm, or 10-35 nm, and a porosity of 5-90%, preferably 20-80%. However, according to the present disclosure, such numerical ranges may be changed with ease according to a particular embodiment, or as necessary.

The pores of the porous polymer substrate may include several types of pore structures. When any one of the average pore size determined by using a porosimeter or observed through field emission-scanning electron microscopy (FE-SEM) satisfies the above-defined range, it falls within the scope of the present disclosure.

Herein, in the case of a generally known monoaxially stretched dry separator, the median pore size in the pore size of the transverse direction (TD), not the pore size of the machine direction (MD), determined through FE-SEM is taken as the standard pore size. In the case of the other porous polymer substrates (e.g. wet polyethylene (PE) separator) having a network structure, the pore size measured by using a porosimeter is taken as the standard pore size.

The first organic/inorganic porous coating layer is coated at least one region selected from at least one surface and the pores of the porous polymer substrate, and includes first inorganic particles and a first binder polymer. The first binder polymer is disposed partially or totally in the first inorganic particles so that the first inorganic particles may be interconnected and fixed.

The second organic/inorganic porous coating layer is coated on the first organic/inorganic porous coating layer, and includes second inorganic particles and a second binder polymer. The second binder polymer is disposed partially or totally in the second inorganic particles so that the second inorganic particles may be interconnected and fixed.

Herein, the second organic/inorganic porous coating layer faces the positive electrode, and the second binder polymer has a higher weight average molecular weight as compared to the weight average molecular weight of the first binder polymer.

According to an embodiment of the present disclosure, the second organic/inorganic porous coating layer including the second binder polymer having a high weight average molecular weight faces the positive electrode, and thus the adhesion to the positive electrode may be increased. On the other hand, the first organic/inorganic porous coating layer including the first binder polymer having a low weight average molecular weight faces the porous polymer substrate, and thus the separator may show reduced resistance.

According to an embodiment of the present disclosure, the first binder polymer may have a weight average molecular weight of 300,000 or more, 330,000 or more, 350,000 or more, 400,000 or more, or 540,000 or more, and 600,000 or less, 580,000 or less, or 560,000 or less. For example, the first binder polymer may have a weight average molecular weight of 333,000-540,000 with a view to ensuring processability in combination with heat resistance and adhesion.

According to an embodiment of the present disclosure, the second binder polymer may have a weight average molecular weight of 800,000 or more, 850,000 or more, 910,000 or more, 950,000 or more, 1,000,000 or more, and 1,500,000 or less, 1,300,000 or less, or 1,200,000 or less. For example, the second binder polymer may have a weight average molecular weight of 910,000-1,300,000 with a view to ensuring processability in combination with heat resistance and adhesion.

Herein, the weight average molecular weight may be determined by using gel permeation chromatography (GPC) (PL GPC220, Agilent Technologies).

Particularly, the weight average molecular weight may be determined under the following analysis conditions:

Column: PL MiniMixed B×2
Solvent: THF
Flow rate: 0.3 mL/min
Sample concentration: 2.0 mg/mL
Injection amount: 10 μL
Column temperature: 40° C.
Detector: Agilent RI detector
Standard: Polystyrene (corrected with tertiary function)
Data processing: ChemStation Each of the first binder polymer and the second binder polymer may independently include any one selected from the group consisting of polyvinylidene fluoride (PVDF), hexafluoropropylene (HFP), polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile-styrene-butadiene copolymer and polyimide, or a mixture of two or more of them.

Herein, the first binder polymer may be the same as or different from the second binder polymer.

The first inorganic particles may be the same as or different from the second inorganic particles.

According to the present disclosure, the inorganic particles are not particularly limited, as long as they are electrochemically stable. In other words, the inorganic particles are not particularly limited, as long as they cause no oxidation and/or reduction in the operating voltage range (e.g. 0-5 V based on $Li/Li^+$) of an applicable electrochemical device. Particularly, when using inorganic particles having a high dielectric constant, they contribute to an increase in dissociation degree of the electrolyte salt, particularly a lithium salt, in a liquid electrolyte, and thus can improve ion conductivity of the electrolyte.

For these reasons, the inorganic particles may include inorganic particles having a dielectric constant of 5 or more, inorganic particles capable of transporting lithium ions and a mixture thereof.

The inorganic particles having a dielectric constant of 5 or more may be at least one selected from the group consisting of $Al_2O_3$, $SiO_2$, $ZrO_2$, $AlO(OH)$, $Al(OH)_3$, $TiO_2$, $BaTiO_3$, $Pb(Zr_xTi_{1-x})O_3$ (PZT, wherein $0<x<1$), $Pb_{1-x}La_xZr_{1-y}Ti_yO_3$ (PLZT, wherein $0<x<1$, $0<y<1$), $(1-x)Pb(Mg_{1/3}Nb_{2/3})O_3$-$xPbTiO_3$ (PMN-PT, wherein $0<x<1$), hafnia ($HfO_2$), $SrTiO_3$, $SnO_2$, $CeO_2$, MgO, NiO, CaO, ZnO, and SiC.

The inorganic particles capable of transporting lithium ions may be at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$) and $P_2S_5$-based glass ($Li_xP_yS_z$, $0<x<3$, $0<y<3$, $0<z<7$).

Although the average particle diameter of the inorganic particles is not particularly limited, the inorganic particles may preferably have an average particle diameter of 0.001-10 μm, more preferably 10 nm to 2 μm, and most preferably 50-150 nm, in order to form a porous coating layer having a uniform thickness and to provide suitable porosity.

Herein, the first and the second organic/inorganic porous coating layers may further include other additives, besides the inorganic particles and the binder polymers.

Meanwhile, the first organic/inorganic porous coating layer may have a larger thickness as compared to the thickness of the second organic/inorganic porous coating layer. For examples, the ratio of the thickness of the first organic/inorganic porous coating layer to the thickness of the second organic/inorganic porous coating layer may be 6:4-9:1, 6:4-8:2, or 6:4-7:3. When the thickness of the second organic/inorganic porous coating layer is smaller than the thickness of the first organic/inorganic porous coating layer as mentioned above, it is easier to reduce the resistance of a cell advantageously.

For example, the first organic/inorganic porous coating layer may have a thickness of 1-10 μm, and the second organic/inorganic porous coating layer may have a thickness of 0.5-10 μm. Herein, although the porosity of each porous coating layer is not particularly limited, it may be 35-65% preferably.

Figure 1:
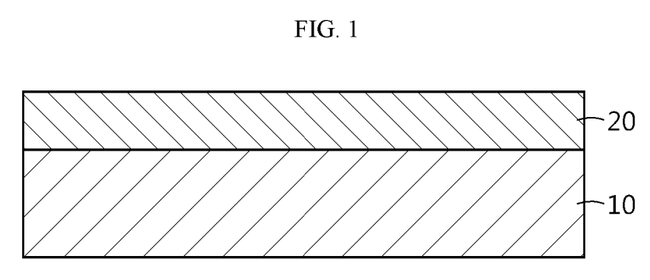
FIG. 1 is a schematic view illustrating the separator according to Comparative Example.
Figure 2:
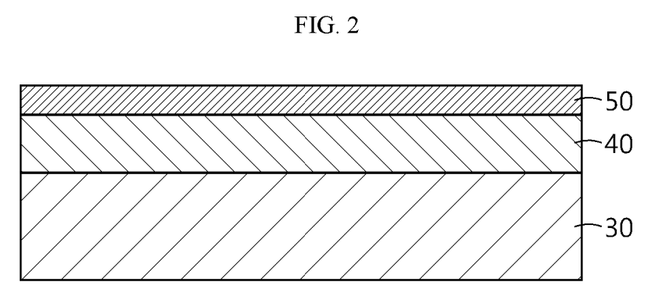
FIG. 2 is a schematic view illustrating the separator according to an embodiment of the present disclosure.

FIG. 1 is a schematic view illustrating the separator according to Comparative Example, and FIG. 2 is a schematic view illustrating the separator according to an embodiment of the present disclosure. As shown in FIG. 1, when the separator includes a porous polymer substrate 10 and a single porous coating layer 20, a large amount of binder polymer having a higher molecular weight cannot be used in the porous coating layer, because the cell resistance is increased. As a result, there is a problem in that it is not possible to improve the adhesion between the positive electrode and the separator. On the contrary, as shown in FIG. 2, when the separator includes a porous polymer substrate 30, a first organic/inorganic porous coating layer 40 and a second organic/inorganic porous coating layer 50, the first organic/inorganic porous coating layer facing the porous polymer substrate uses a binder polymer having a low weight average molecular weight and showing low resistance to reduce the cell resistance. In addition, the second organic/inorganic porous coating layer facing the positive electrode uses a binder polymer having a high weight average molecular weight to enhance the adhesion between the separator and the positive electrode. As a result, it is possible to enhance the heat-radiating characteristics of the cell advantageously.

In another aspect of the present disclosure, there is provided a method for manufacturing a separator for a lithium secondary battery.

Particularly, there is provided a method for manufacturing a battery cell which includes an electrode assembly received in a battery casing and including a positive electrode, a negative electrode and a separator interposed between the positive electrode and the negative electrode, including the steps of:

adding first inorganic particles to a first binder solution containing a first binder polymer dissolved in a first solvent and carrying out agitation to form slurry for a first organic/inorganic porous coating layer including the first inorganic particles dispersed therein;

adding second inorganic particles to a second binder solution containing a second binder polymer dissolved in a second solvent and carrying out agitation to form slurry for a second organic/inorganic porous coating layer including the second inorganic particles dispersed therein;

applying the slurry for a first organic/inorganic porous coating layer to at least one surface of a porous polymer substrate, followed by drying, to form the first organic/inorganic porous coating layer in at least one region selected from at least one surface and the pores of the porous polymer substrate; and applying the slurry for a second organic/inorganic porous coating layer onto the first organic/inorganic porous coating layer, followed by drying, to form the second organic/inorganic porous coating layer, wherein the second organic/inorganic porous coating layer faces the positive electrode, and the second binder polymer has a weight average molecular weight higher than the weight average molecular weight of the first binder polymer.

First, the first inorganic particles are added to the first binder solution containing the first binder polymer dissolved in the first solvent and carrying out agitation to form slurry for a first organic/inorganic porous coating layer including the first inorganic particles dispersed therein.

The first binder polymer may be the same as described above with reference to the separator for a secondary battery.

The first solvent preferably may have a solubility parameter similar to the solubility parameter of the binder polymer to be used and have a low boiling point. This is because such a solvent allows homogeneous mixing and may be removed with ease subsequently. Non-limiting examples of the first solvent may include any one selected from the group consisting of acetone, tetrahydrofuran, methylene chloride, chloroform, dimethyl formamide, N-methyl-2-pyrrolidone (NMP) and cyclohexane, or a mixture of two or more of them.

The first inorganic particles are added to the first binder polymer solution to form slurry for a first organic/inorganic porous coating layer containing the first inorganic particles dispersed therein.

The first inorganic particles may be the same as described above with reference to the separator for a secondary battery.

The content of the first solvent may be about 40-95 wt %, or about 60-90 wt %, based on the weight of the slurry for a first organic/inorganic porous coating layer. When the content of the first solvent satisfies the above-defined range, it is easier to help maintain the pore structure of the porous polymer substrate, while ensuring the wettability of the slurry for a first organic/inorganic porous coating layer on the porous polymer substrate during the subsequent coating process.

The first inorganic particles may be added after they are pulverized in advance to a predetermined average particle diameter. Otherwise, the first inorganic particles may be added to the first binder polymer solution, and then pulverized and dispersed while controlling them to have a predetermined average particle diameter by using a ball milling process, or the like.

The weight ratio of the first inorganic particles to the first binder polymer may be 90:10-50:50. When the weight ratio of the first inorganic particles to the total content of the first binder polymer satisfies the above-defined range, it is easier to prevent the problem of a decrease in pore size and porosity of the resultant first porous coating layer, caused by an increase in content of the first binder polymer. It is also easier to solve the problem of degradation of peeling resistance of the resultant first porous coating layer, caused by a decrease in content of the first binder polymer.

The first inorganic particles may be dispersed by using a method generally known to those skilled in the art. For example, a ball mill, a bead mill, a disperser, a mixer, or the like may be used. Particularly, ball milling or bead milling processes are preferred. Herein, the dispersion treatment time may vary with the volume of particles, but may be 1-20 hours suitably. In addition, the particle size of the pulverized first inorganic particles may be controlled through the size of the beads used for ball milling or bead milling and ball milling (bead milling) time.

The second binder polymer may be the same as or different from the first binder polymer, and independently from this, the second solvent may be the same as or different from the first solvent. The second inorganic particles are added to the second binder polymer solution to form slurry for a second organic/inorganic porous coating layer containing the second inorganic particles dispersed therein. The second inorganic particles may be the same as described above with reference to the separator for a secondary battery.

The second solvent preferably may have a solubility parameter similar to the solubility parameter of the binder polymer to be used and have a low boiling point. This is because such a solvent allows homogeneous mixing and may be removed with ease subsequently. Non-limiting examples of the second solvent may include any one selected from the group consisting of acetone, tetrahydrofuran, methylene chloride, chloroform, dimethyl formamide, N-methyl-2-pyrrolidone (NMP) and cyclohexane, or a mixture of two or more of them.

The second inorganic particles are added to the second binder polymer solution to form slurry for a second organic/inorganic porous coating layer containing the second inorganic particles dispersed therein.

The second binder polymer may be the same as described above with reference to the separator for a secondary battery.

The content of the second solvent may be about 40-95 wt %, or about 60-90 wt % of the slurry for a second organic/inorganic porous coating layer. When the content of the second solvent satisfies the above-defined range, mixing of the first organic/inorganic porous coating layer with the second organic/inorganic porous coating layer is easier to be prevented before the subsequent drying. Therefore, it is possible to facilitate forming a stable interface state.

The second inorganic particles may be added after they are pulverized in advance to a predetermined average particle diameter. Otherwise, the second inorganic particles may be added to the second binder polymer solution, and then pulverized and dispersed while controlling them to have a predetermined average particle diameter by using a ball milling process, or the like.

The weight ratio of the second inorganic particles to the second binder polymer may be 90:10-50:50. When the weight ratio of the second inorganic particles to the total content of the second binder polymer satisfies the above-defined range, it is easier to prevent the problem of a decrease in pore size and porosity of the resultant second porous coating layer, caused by an increase in content of the second binder polymer. It is also easier to solve the problem of degradation of peeling resistance of the resultant second porous coating layer, caused by a decrease in content of the second binder polymer.

The second inorganic particles may be dispersed by using a method generally known to those skilled in the art. For example, a ball mill, a bead mill, a disperser, a mixer, or the like may be used. Particularly, ball milling or bead milling processes are preferred. Herein, the dispersion treatment time may vary with the volume of particles, but may be 1-20 hours suitably. In addition, the particle size of the pulverized second inorganic particles may be controlled through the size of the beads used for ball milling or bead milling and ball milling (bead milling) time.

Next, the slurry for a first organic/inorganic porous coating layer formed above is applied to at least one surface of the porous polymer substrate. Then, the porous polymer substrate coated with the slurry for a first organic/inorganic porous coating layer is dried to remove the first solvent in the slurry for a first organic/inorganic porous coating layer. Once the first solvent is removed, the first organic/inorganic porous coating layer is formed on at least one region selected from at least one surface and the pores of the porous polymer substrate.

The porous polymer substrate may be the same as described above with reference to the separator. The porous polymer substrate may be obtained by forming pores through the conventional methods, such as a wet process using a solvent, diluent or a pore-forming agent, or a dry process based on stretching process, known to those skilled in the art as a method for ensuring excellent air permeability and porosity from the above-mentioned substrate materials.

The slurry for a first organic/inorganic porous coating layer including the first inorganic particles dispersed therein may be coated on the porous polymer substrate through the conventional coating processes known to those skilled in the art. Particular examples of the coating processes may include dip coating, slot die coating, roll coating or comma coating, or a combination thereof. In addition, the first organic/inorganic porous coating layer may be formed on both surfaces of the porous polymer substrate or merely on one surface of the porous polymer substrate selectively. The first organic/inorganic porous coating layer formed by the coating method as above is present not only on the surface of the porous polymer substrate but also inside thereof due to the characteristic of the porous polymer substrate.

Next, the slurry for a second organic/inorganic porous coating layer formed from above is applied onto the first organic/inorganic porous coating layer formed from above. Then, the first organic/inorganic porous coating layer coated with the slurry for a second organic/inorganic porous coating layer is dried to remove the second solvent in the slurry for a second organic/inorganic porous coating layer, thereby forming the second organic/inorganic porous coating layer on the first organic/inorganic porous coating layer.

The slurry for a second organic/inorganic porous coating layer including the second inorganic particles dispersed therein may be coated on the first organic/inorganic porous coating layer through the conventional coating processes known to those skilled in the art, as mentioned earlier with reference to the first organic/inorganic porous coating layer.

In addition to the separator, the positive electrode, negative electrode and the electrolyte are known to those skilled in the art, and may be commercially available or may be prepared with ease through a process and/or method known to those skilled in the art.

In the organic/inorganic porous coating layers, the inorganic particles may be bound to one another by the binder polymer, while they are packed and are in contact with one another, thereby forming interstitial volumes among the inorganic particles, and the interstitial volumes among the inorganic particles become vacant spaces to form pores.

In other words, the binder polymer may attach the inorganic particles to one another so that they may retain their binding states, and thus connect the inorganic particles with one another and fix them. In addition, the pores of the organic/inorganic porous coating layers may be those formed by the interstitial volumes among the inorganic particles which become vacant spaces. The spaces may be defined by the inorganic particles facing each other substantially in a closely packed or densely packed structure of the inorganic particles.

The drying may be carried out in a drying chamber, wherein the condition of the drying chamber is not particularly limited due to the application of a non-solvent.

However, since the separator is dried under a humidified condition according to an embodiment of the present disclosure, the binder polymer may be distributed predominantly on the surface of the organic/inorganic porous coating layer. The drying step may be carried out under a relative humidity of 30% or more, 35% or more, or 40% or more, and 80% or less, 75% or less, or 70% or less. For example, the drying step may be carried out under a relative humidity of 40-80%. In addition, the drying step may be carried out at a temperature of 20-120° C., 20-100° C., or 20-70° C., for 0.1-2 minutes.

In still another aspect of the present disclosure, there is provided an electrochemical device including a positive electrode, a negative electrode and a separator interposed between the positive electrode and the negative electrode, wherein the separator is the above-described separator according to an embodiment of the present disclosure.

According to an embodiment of the present disclosure, the adhesion between the separator and the positive electrode in the electrochemical device may be 40 gf/25 mm or more.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium-ion secondary batteries, lithium polymer secondary batteries or lithium-ion polymer batteries, are preferred.

The two electrodes, positive electrode and negative electrode, used in combination with the separator according to the present disclosure are not particularly limited, and may be obtained by allowing electrode active materials to be bound to an electrode current collector through a method generally known in the art. Among the electrode active materials, non-limiting examples of a positive electrode active material may include conventional positive electrode active materials that may be used for the positive electrodes for conventional electrochemical devices. Particularly, NCM-based materials, lithium manganese oxides, lithium cobalt oxides, lithium nickel oxides, lithium iron oxides or lithium composite oxides containing a combination thereof may be used preferably. Non-limiting examples of a negative electrode active material include conventional negative electrode active materials that may be used for the negative electrodes for conventional electrochemical devices. Particularly, lithium-intercalating materials, such as lithium metal or lithium alloys, carbonaceous materials, petroleum coke, activated carbon, graphite or other carbonaceous materials, are used preferably. Non-limiting examples of a positive electrode current collector may include foil made of aluminum, nickel or a combination thereof. Non-limiting examples of a negative electrode current collector may include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a mixture thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

Manufacture of Separator

First, polyvinylidene fluoride (Kureha Co., PVDF) having a weight average molecular weight of 330,000 was introduced as a first binder polymer to N-methyl-2-pyrrolidone as a first solvent and dissolved therein at 50° C. for about 4 hours to prepare a first binder polymer solution. Next, aluminum hydroxide ($Al(OH)_3$, particle size (D50): 60 nm) was introduced as first inorganic particles to the first binder polymer solution. Herein, the weight ratio of the first inorganic particles to first binder polymer was controlled to 80:20 to prepare slurry for forming a first organic/inorganic porous coating layer. Herein, the solid content (slurry free from the solvent) was 18 parts by weight based on 100 parts by weight of the slurry for forming a first organic/inorganic porous coating layer.

Then, polyvinylidene fluoride (PVDF) having a weight average molecular weight of 910,000 was introduced as a second binder polymer to N-methyl-2-pyrrolidone as a second solvent and dissolved therein at 50° C. for about 4 hours to prepare a second binder polymer solution. Next, aluminum hydroxide ($Al(OH)_3$, particle size (D50): 60 nm) was introduced as second inorganic particles to the second binder polymer solution. Herein, the weight ratio of the second inorganic particles to second binder polymer was controlled to 80:20 to prepare slurry for forming a second organic/inorganic porous coating layer. Herein, the solid content (slurry free from the solvent) was 18 parts by weight based on 100 parts by weight of the slurry for forming a second organic/inorganic porous coating layer.

After that, the slurry for forming a first organic/inorganic porous coating layer was applied to both surfaces of a polyethylene porous film (porosity: 45%) having a thickness of 9 μm through a dip coating process at a rate of 5 m/min. at 23° C., and dried at 110° C. under a relative humidity of 45% to form the first organic/inorganic porous coating layer having a thickness of 2.1 μm on each surface of the porous film.

Finally, the slurry for forming a second organic/inorganic porous coating layer was applied on both surfaces of first organic/inorganic porous coating layer through a dip coating process at a rate of 5 m/min. at 23° C., and dried at 110° C. under a relative humidity of 45% to form the second organic/inorganic porous coating layer having a thickness of 0.9 μm on each surface of the first organic/inorganic porous coating layer. Herein, the ratio of the thickness of the first organic/inorganic porous coating layer to the thickness of the second organic/inorganic porous coating layer was 7:3.

Manufacture of Battery Cell

First, $LiNi_{0.6}Co_{0.2}Mn_{0.2}O_2$ as a positive electrode active material, carbon black and polyvinylidene fluoride (PVDF) were mixed at a weight ratio of 96:2:2, and the resultant mixture was introduced to and mixed with N-methyl-2-pyrrolidone (NMP) to prepare positive electrode slurry. The resultant positive electrode slurry was coated on aluminum foil (thickness: 20 μm) to a capacity of 3.28 mAh/g to obtain a positive electrode.

In addition, artificial graphite as a negative electrode active material, Denka black as a conductive material and polyvinylidene fluoride (PVDF) as a binder were mixed at a weight ratio of 75:5:20, and the resultant mixture was added to N-methyl pyrrolidone as a solvent to prepare negative electrode slurry.

The negative electrode slurry was coated on a copper current collector to a loading amount of 3.8 mAh/cm$^2$, followed by drying, to obtain a negative electrode.

The separator obtained as described above was interposed between the positive electrode and the negative electrode in such a manner that the second organic/inorganic porous coating layer might face the positive electrode, and a non-aqueous electrolyte (1 M $LiPF_6$, ethylene carbonate (EC)/propylene carbonate (PC)/diethyl carbonate (DEC)=3:3:4, volume ratio) was injected thereto to obtain a battery cell.

Comparative Example 1

Manufacture of Separator

First, polyvinylidene fluoride (Kureha Co., PVDF) having a weight average molecular weight of 330,000 was introduced as a binder polymer to N-methyl-2-pyrrolidone as a solvent and dissolved therein at 50° C. for about 4 hours to prepare a binder polymer solution. Next, aluminum hydroxide ($Al(OH)_3$, particle size (D50): 60 nm) was introduced as inorganic particles to the binder polymer solution. Herein, the weight ratio of the inorganic particles to binder polymer was controlled to 80:20 to prepare slurry for forming an organic/inorganic porous coating layer. Herein, the solid content (slurry free from the solvent) was 18 parts by weight based on 100 parts by weight of the slurry.

Then, the slurry for forming an organic/inorganic porous coating layer was applied to both surfaces of a polyethylene porous film (porosity: 45%) having a thickness of 9 μm through a dip coating process, and dried at 23° C. under a relative humidity of 45% to form organic/inorganic porous coating layers having a thickness of 3 μm on each surface of the porous film.

Manufacture of Battery Cell

A battery cell was obtained in the same manner as Example 1, except that the separator obtained in this Example was used.

Comparative Example 2

Manufacture of Separator

A separator was obtained in the same manner as Comparative Example 1, except that polyvinylidene fluoride (PVDF) having a weight average molecular weight of 910,000 was used as a binder polymer.

Manufacture of Battery Cell

A battery cell was obtained in the same manner as Example 1, except that the separator obtained in this Example was used.

Comparative Example 3

Manufacture of Separator

First, polyvinylidene fluoride (Kureha Co., PVDF) having a weight average molecular weight of 910,000 was introduced as a first binder polymer to N-methyl-2-pyrrolidone as a first solvent and dissolved therein at 50° C. for about 4 hours to prepare a first binder polymer solution. Next, aluminum hydroxide (Al(OH)$_3$, particle size (D50): 60 nm) was introduced as first inorganic particles to the first binder polymer solution. Herein, the weight ratio of the first inorganic particles to first binder polymer was controlled to 80:20 to prepare slurry for forming a first organic/inorganic porous coating layer. Herein, the solid content (slurry free from the solvent) was 18 parts by weight based on 100 parts by weight of the slurry for forming a first organic/inorganic porous coating layer.

Then, polyvinylidene fluoride (PVDF) having a weight average molecular weight of 330,000 was introduced as a second binder polymer to N-methyl-2-pyrrolidone as a second solvent and dissolved therein at 50° C. for about 4 hours to prepare a second binder polymer solution. Next, aluminum hydroxide (Al(OH)$_3$, particle size (D50): 60 nm) was introduced as second inorganic particles to the second binder polymer solution. Herein, the weight ratio of the second inorganic particles to second binder polymer was controlled to 80:20 to prepare slurry for forming a second organic/inorganic porous coating layer. Herein, the solid content (slurry free from the solvent) was 15 parts by weight based on 100 parts by weight of the slurry for forming a second organic/inorganic porous coating layer.

After that, the slurry for forming a first organic/inorganic porous coating layer was applied to both surfaces of a polyethylene porous film (porosity: 45%) having a thickness of 9 μm through a dip coating process, and dried at 23° C. under a relative humidity of 45% to form the first organic/inorganic porous coating layer having a thickness of 2.1 μm on each surface of the porous film.

Finally, the slurry for forming a second organic/inorganic porous coating layer was applied to both surface of the first organic/inorganic porous coating layer through a dip coating process, and dried at 23° C. under a relative humidity of 45% to form the second organic/inorganic porous coating layer having a thickness of 0.9 μm on each surface of the first organic/inorganic porous coating layer. Herein, the ratio of the thickness of the first organic/inorganic porous coating layer to the thickness of the second organic/inorganic porous coating layer was 7:3.

Manufacture of Battery Cell

A battery cell was obtained in the same manner as Example 1, except that the separator obtained in this Example was used.

Test Example: Evaluation of Physical Properties of Battery Cell

The battery cell according to each of Example 1 and Comparative Examples 1-3 was evaluated in terms of the thickness of the porous coating layer, adhesion between the positive electrode and the separator, overcharge safety and the pulse resistance. The results are shown in the following Table 1.

TABLE 1

| | Weight average molecular weight | | Thickness of first organic/inorganic porous coating layer to Thickness of second organic/inorganic porous coating layer | Adhesion between positive electrode and separator (gf/25 mm) | Overcharge safety test (5 runs) | Pulse resistance (2.5 C, 30 sec., SOC50) |
|---|---|---|---|---|---|---|
| | First organic/inorganic porous coating layer | Second organic/inorganic porous coating layer | | | | |
| Ex. 1 | 330,000 | 910,000 | 7:3 | 60.7 kgf | 5/5 | 2.56 mohm |
| Comp. Ex. 1 | 330,000 | | — (single organic/inorganic porous coating layer) | 20.1 kgf | 0/5 | 1.97 mohm |
| Comp. Ex. 2 | | 910,000 | — (single organic/inorganic porous coating layer) | 69.1 kgf | 5/5 | 4.12 mohm |
| Comp. Ex. 3 | 910,000 | 330,000 | 7:3 | 23.9 kgf | 0/5 | 2.43 mohm |

As can be seen from Table 1, in the case of Example 1, it can be seen that the second binder polymer used in the second organic/inorganic porous coating layer has a higher weight average molecular weight as compared to the weight average molecular weight of the first binder polymer, and thus the adhesion between the positive electrode and the separator can be improved.

On the contrary, when using a binder polymer having a low weight average molecular weight alone in Comparative Example 1, the battery cell cannot pass the safety test at all and shows low adhesion between the positive electrode and the separator. In the case of Comparative Example 2, a binder polymer having a high weight average molecular weight is used alone to cause an excessive increase in resistance.

In the case of Comparative Example 3, a binder polymer having a low weight average molecular weight is used in the second organic/inorganic porous coating layer, and a binder polymer having a high weight average molecular weight is used in the first organic/inorganic porous coating layer. In this case, the interfacial adhesion between the positive electrode and the separator is decreased significantly, unlike Example 1. Therefore, the battery shows poor heat-radiating characteristics, resulting in explosion of the cell itself.

Test Methods

1) Determination of Weight Average Molecular Weight of Binder Polymer

The weight average molecular weight of the binder polymer used in the organic/inorganic porous coating layer of the separator in the battery cell according to each of Example 1 and Comparative Examples 1-3 was determined through gel permeation chromatography (GPC, PL GPC220, Agilent Technologies) under the following conditions:

Column: PL MiniMixed B×2
Solvent: THF
Flow rate: 0.3 mL/min
Sample concentration: 2.0 mg/mL
Injection amount: 10 µL
Column temperature: 40° C.
Detector: Agilent RI detector
Standard: Polystyrene (corrected with tertiary function)
Data processing: ChemStation 2) Determination of Thickness The thickness of each organic/inorganic porous coating layer was determined by using a thickness gauge (VL-50S-B, available from Mitutoyo Co.).

3) Determination of Adhesion (Lami Strength) Between Positive Electrode and Separator In the battery cell according to each of Example 1 and Comparative Examples 1-3, the adhesion (Lami strength) between the positive electrode and the separator was determined as follows.

The positive electrode was cut into a size of 25 mm×100 mm. The separator was cut into a size of 25 mm×100 mm. The prepared separator was stacked with the positive electrode, and the resultant stack was inserted between PET films having a thickness of 100 µm and adhered by using a flat press. Herein, the flat press was heated and pressurized at 80° C. under a pressure of 1000 kgf for 1 second. The adhered separator and positive electrode were attached to slide glass by using a double-sided tape. The end portion (10 mm or less from the end of the adhered surface) of the adhered surface of the separator was peeled off and attached to a 25 mm×100 mm PET film by using a single-sided tape so that they might be connected in the longitudinal direction. Then, the slide glass was mounted to the lower holder of a UTM instrument (LLOYD Instrument LF Plus), and the PET film adhered to the separator was mounted to the upper holder of the UTM instrument. Then, force was applied at 180° and a rate of 100 mm/min. The force required for separating the positive electrode from the outermost porous coating layer (the second organic/inorganic porous coating layer or the organic/inorganic porous coating layer) facing the positive electrode was measured.

4) Evaluation of Overcharge Safety

The battery cell according to each of Example 1 and Comparative Examples 1-3 was charged fully to 0.3 C/4.2 V. The overcharge test was carried out by determining whether explosion occurs or not, when the battery cell is charged at a current of 1 C to 8.4 V at room temperature.

5) Determination of Pulse Resistance

The battery cell according to each of Example 1 and Comparative Examples 1-3 was charged/discharged once at 0.33 C/25° C. to 4.2-2.5 V and set to SOC (state of charge) 50, and then discharged at 2.5 C rate for 30 seconds. Then, the cell voltage profile was plotted, and the resistance was calculated by subtracting the OCV (open circuit voltage) from the voltage and dividing the resultant value by the current. (For example, the pulse resistance was calculated according to the formula of (4.2 V−3.6 V)/1 A=0.6 ohm).

What is claimed is:

1. A battery cell, comprising:
an electrode assembly present in a battery casing,
wherein the electrode assembly comprises a positive electrode, a negative electrode and a separator interposed between the positive electrode and the negative electrode,
wherein the separator comprises a porous polymer substrate, a first organic/inorganic porous coating layer on at least one surface of the porous polymer substrate, and a second organic/inorganic porous coating layer on a surface of the first organic/inorganic porous coating layer,
wherein the first organic/inorganic porous coating layer comprises first inorganic particles and a first binder polymer,
wherein the second organic/inorganic porous coating layer comprises second inorganic particles and a second binder polymer,
wherein the second organic/inorganic porous coating layer faces the positive electrode, and
wherein the second binder polymer has a weight average molecular weight higher than a weight average molecular weight of the first binder polymer.

2. The battery cell according to claim 1, wherein the weight average molecular weight of the second binder polymer ranges from 800,000 to 1,500,000.

3. The battery cell according to claim 1, wherein the weight average molecular weight of the first binder polymer ranges from 300,000 to 600,000.

4. The battery cell according to claim 1, wherein the first organic/inorganic porous coating layer has a thickness larger than a thickness of the second organic/inorganic porous coating layer.

5. The battery cell according to claim 4, wherein a ratio of the thickness of the first organic/inorganic porous coating layer to the thickness of the second organic/inorganic porous coating layer is 6:4 to 9:1.

6. The battery cell according to claim 1, wherein each of the first binder polymer and the second binder polymer is at least one independently selected from the group consisting of polyvinylidene fluoride (PVDF), hexafluoropropylene (HFP), polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile-styrene-butadiene copolymer and polyimide.

7. The battery cell according to claim 1, wherein an adhesion between the separator and the positive electrode is 40 gf/25 mm or more.

8. The battery cell according to claim 1, wherein the first binder polymer is the same as or different from the second binder polymer.

9. The battery cell according to claim 1, wherein the first inorganic particles are the same or different from the second inorganic particles.

* * * * *